United States Patent [19]
Lee

[11] Patent Number: 6,118,614
[45] Date of Patent: *Sep. 12, 2000

[54] METHOD AND APPARATUS FOR OPTIMIZING WRITE CURRENT DURING SERVO WRITING A MAGNETIC DISK RECORDING DEVICE

[75] Inventor: Jae-Sung Lee, Seoul, Rep. of Korea

[73] Assignee: SamSung Electronics Co., Ltd., Suwon, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/933,338

[22] Filed: Sep. 18, 1997

[30] Foreign Application Priority Data

Sep. 18, 1996 [KR] Rep. of Korea ........................ 96-40655

[51] Int. Cl.[7] ............................... G11B 21/02; G11B 5/09
[52] U.S. Cl. .............................................. 360/75; 360/53
[58] Field of Search ................................... 360/46, 53, 75

[56] References Cited

U.S. PATENT DOCUMENTS

| | | | |
|---|---|---|---|
| 4,642,709 | 2/1987 | Vinal | 360/77.05 |
| 5,408,367 | 4/1995 | Emo | 360/53 |
| 5,600,500 | 2/1997 | Madsen et al. | 360/46 |
| 5,610,776 | 3/1997 | Oh | 360/53 |
| 5,687,036 | 11/1997 | Kassab | 360/53 |

OTHER PUBLICATIONS

Electronics, Aug. 25, 1983, No. 17, pp. 147–151.

*Primary Examiner*—Paul Loomis
*Assistant Examiner*—Regina Y. Neal
*Attorney, Agent, or Firm*—Robert E. Bushnell, Esq.

[57] ABSTRACT

A servo writer optimizes a write current during servowriting a magnetic disk recording device by measuring the head performances at the inner, outer, and middle regions prior to writing the servo information with optimal write current in order to obtain the best qualified servo.

9 Claims, 4 Drawing Sheets

METHOD AND APPARATUS FOR OPTIMIZING WRITE CURRENT DURING SERVO WRITING A MAGNETIC DISK RECORDING DEVICE

This application makes reference to, incorporates the same herein, and claims all benefits accruing under 35 U.S.C. §119 from an application for *METHOD FOR OPTIMIZING WRITE CURRENT DURING SERVOWRITING A MAGNETIC DISK RECORDING DEVICE* earlier filed in the Korean Industrial Property Office on the 18$^{th}$ of September 1996, and there duly assigned Ser. No. 40655/1966, a copy of which application is annexed hereto.

BACKGROUND OF THE INVENTION

1. Technical Field

The present invention relates to a magnetic disk recording device, and more particularly, to a method for optimizing a write current during a servowriting operation of a hard disk drive.

2. Related Art

In general, a magnetic disk recording device such as a hard disk drive ("HDD") and floppy disk drive ("FDD") is widely used in a computer system as an auxiliary memory. In particular, the HDD stores a large amount of data safely and permits data access at high speed.

Conventionally, the HDD is manufactured by a series of manufacturing processes including assembling the HDD→writing servo information→performing a function test→perfonning a burn-in test→combining HDA (Hard Disk Assembly) with PCBA (Printed Circuit Board Assembly)→performing other tests. Generally, a servo information writing process involves writing positional information on a recording medium such as a magnetic disk, and the function testing process involves determining whether a maintenance cylinder is defective and whether a data area is readable/writable. The burn-in testing process requires determining whether the data area is defective.

In more detail, during the servo information writing process, a servo writer moves a head (data transducer) of the HDD in a predetermined direction and distance in order to write a variety of servo information (or positional information) for controlling a position of the head on the disk. The servo information written has tremendous influence not only on a track searching performance but also on a track tracing performance during servo control operation. This is because the track searching and track tracing control operations depend heavily on the servo information written for maintaining high data read/write performance. As a result, the quality of HDD is dependent upon the servo writing feature.

Generally, a write current applied equally to each HDD during the servo writing operation is adjusted at an initial stage in order to optimize the performance of the head and disk. The performance of the head and disk which are principal components of the HDD is susceptible to the head stacking condition and the head assembling process. In particular, the amplitude, resolution, overshoot, undershoot, and etc. of the HDD are influenced differently at different locations from the inside and outside of the disk. Thus, even though the head and disk components are of good quality, an assembly thereof is not necessarily optimized for performance. Accordingly, I have noted that it is not appropriate to equally apply the like write current to the HDD for securing the optimal performance of every head and disk.

Exemplars of contemporary method of optimizing write current in a HDD are disclosed in U.S. Pat. No. 5,408,367 for *Method Of Optimizing Operation Of Disk Drive* issued to Emo, and U.S. Pat. No. 5,600,500 for *Performance Based Write Current Optimization Process* issued to Madsen et al. In Emo '367, for example, the write current is optimized by selecting the current level that has the lowest error rate based on calibration. In Madsen et al. '500, the write current is optimized by measuring a bit error rate in a HDD as a function of the write current in the presence of background interference stress and adjacent track interference stress. While the contemporary methods of optimizing operation of HDD are worthy optimization solution to servo writing operation, I believe that alternative techniques for optimizing write current during servo writing operation of a HDD are needed.

SUMMARY OF THE INVENTION

Accordingly, it is therefore an object of the present invention to provide a method for optimizing write current during servo writing a disk drive.

It is also an object to provide a method for optimizing write current in a servo writer for obtaining high quality servo information.

It is another object to provide a method for optimizing write current during servo writing a disk drive by measuring head performance at inner, outer, and middle regions of a disk respectively, and then writing servo information by using an optimal write current based on the measurement.

These and other objects of the present invention can be achieved by a method for optimizing write current during a servo writing operation of a magnetic disk recording device using a servo writer. The method includes organizing a disk in a plurality of data regions along a radial direction; measuring optimal write current values for the respective organized data regions of the disk by using off-track error ratio values; and writing servo information in specific tracks of the respective organized data regions of the disk by using the optimal write current values corresponding to the respective organized data regions.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
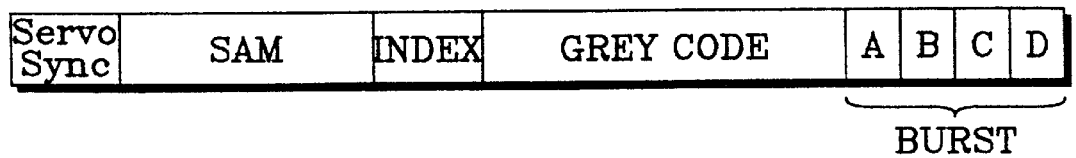
FIG. 1 illustrates a typical servo information format embedded in a specific track of a disk.

Referring now to the drawings and particularly to FIG. 1, which illustrates an embedded servo information format written by a contemporary servo writer. The servo information format includes a servo synchronous pattern, a servo address mark (SAM) pattern, an index, a grey code pattern, and bursts A, B, C and D. The servo synchronous pattern which comes at the front end of the servo information is used to search for the servo address mark SAM which uses a special pattern that can not be generated in the data area. A reference timing of a servo sector is determined in accordance with the time at which the servo address mark SAM is detected. The grey code has information of a track position on the disk. The burst signals A, B, C and D have information of the head position within a track. After completion of the servo writing operation, a number of tracks are formed on the disk. The tracks on the disk are widely divided into an outer-guard band and an inner-guard band for securing a safe operation of the head, and a user data area. Since the servo information written is used to control the head, the servo writing operation has tremendous influence not only on a track searching performance but also on a track tracing performance during a servo control operation. This is because the track searching and track tracing control operations depend heavily on the servo information written during the servo writing operation. For this reason, the quality of HDD is dependent upon the servo writing feature.

A write current applied equally to each HDD during the servo writing operation is adjusted at an initial stage in order to optimize the performance of the head and disk. The performance of the head and disk which are principal components of the HDD is susceptible to the head stacking condition and the head assembling process. In particular, the amplitude, resolution, overshoot, undershoot, and etc. of the HDD are influenced differently at different locations from the inside and outside of the disk. Thus, even though the head and disk components are of good quality, an assembly thereof is not necessarily optimized for performance. As I have noted earlier that it is not appropriate to equally apply the like write current to the HDD for securing the optimal performance of every head and disk.

Figure 2:
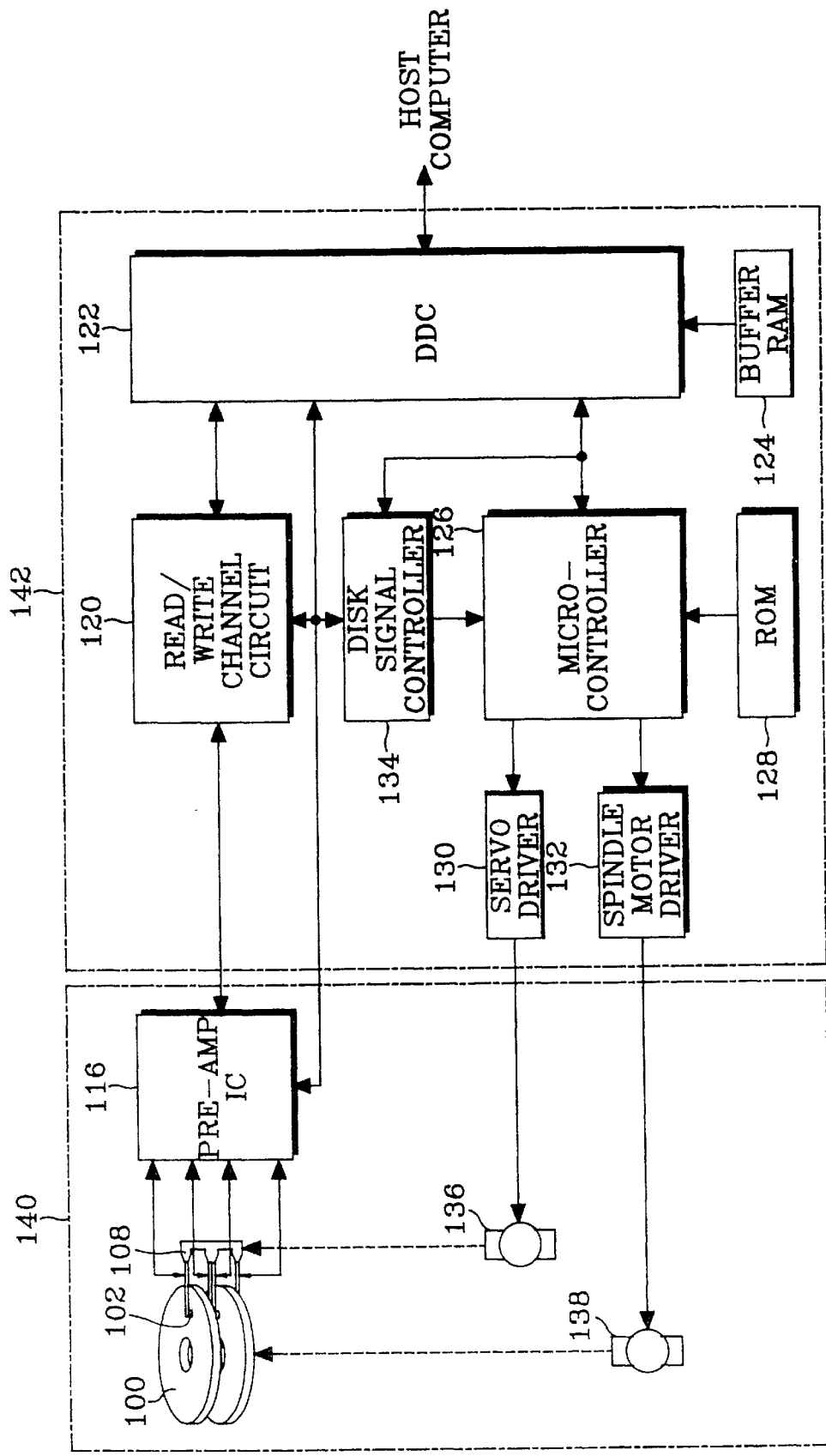
FIG. 2 is a block diagram of a hard disk drive (HDD) to which the present invention is applicable.

FIG. 2 illustrates an example of a HDD supporting two disks and four heads to which the present invention is applicable. As shown in FIG. 2, the HDD is divided into an HDA (Hard Disk Assembly) 140 and a PCBA (Printed Circuit Board Assembly) 142. The HDA 140 includes disks 100, heads 102, an actuator 108, a pre-amplifier IC 116, an actuator motor 136, and a spindle motor 138. The PCBA 142 includes a read/write channel circuit 120, a disk data controller (DDC) 122, a buffer RAM 124, a micro-controller 126, a read-only-memory (ROM) 128, a servo driver 130, a spindle motor driver 132, and a disk signal controller 134.

The disks 100 mounted on a spindle 110 in a stacked form are rotatable by the spindle motor 138. The heads 102 are respectively positioned in opposing relation to the corresponding disk surfaces of the disks 100 and are mounted on the actuator 108 coupled to the actuator motor 136. The pre-amplifier IC 116 connected to the heads 102 pre-amplifies, during reading, an analog read signal picked up by the heads 102 to apply the amplified signal to the read/write channel circuit 120, and applies, during writing, a write current to the heads 102 according to encoded write data generated from the read/write channel circuit 120 so as to write the data on the disk. The pre-amplifier IC 116 selectively connects one of the heads 102 to the read/write channel circuit 120 according to a head selection signal generated from the disk signal controller 134.

The read/write channel circuit 120 detects a data pulse from the read signal output of the pre-amplifier IC 116 and encodes the data pulse to apply to the DDC 122. Alternatively, the read/write channel circuit 120 decodes write data generated from the DDC 122 to apply to the pre-amplifier IC 116. The DDC 122 writes data received from a host computer such as a personal computer on the disks 100, and reads data from the disks 100 to transmit to the host computer. Further, the DDC 122 interfaces a communication between the host computer and the micro-controller 126. The buffer RAM 124 temporarily stores data transmitted between the host computer, the micro-controller 126, and the read/write channel circuit 120. The DDC 122 is sometimes called "interface controller." The micro-controller 126 controls a read/write operation and a servo control (i.e., track searching and track tracing) in association with the DDC 122 which responds to a read or write command received from the host computer. The ROM 128 stores an execution software program of the micro-controller 126 and various setting values. The servo driver 130 generates a driving current for driving the actuator motor 136 in response to a control signal, generated from the micro-controller 126, for controlling the position of the heads 102, and applies the driving current to the actuator motor 136. The actuator motor 136 coupled to the actuator 108 drives the heads 102 on the disks 100 in response to the direction and level of the driving current generated from the servo driver 130 The spindle motor driver 132 drives the spindle motor 138 according to a control signal, generated from the micro-controller 126, for controlling the revolution of the disks 100, so as to rotate the disks 100. In addition, the disk signal controller 134 decodes servo information of the read data generated from the read/write channel circuit 120 so as to apply the decoded servo information to the micro-controller 126, and generates various control signals required for the read/write operation according to the output signals from the DDC 122 and the micro-controller 126 so as to apply the generated control signals to the pre-amplifier IC 116, the read/write channel circuit 120 and the DDC 122. Here, the disk signal controller 134 further generates the head selection signal for switching the heads 102. It is noted that an ASIC (Application Specification Integrated Circuit) designed suitably for the HDD can be used for the disk signal controller 134.

Figure 3:
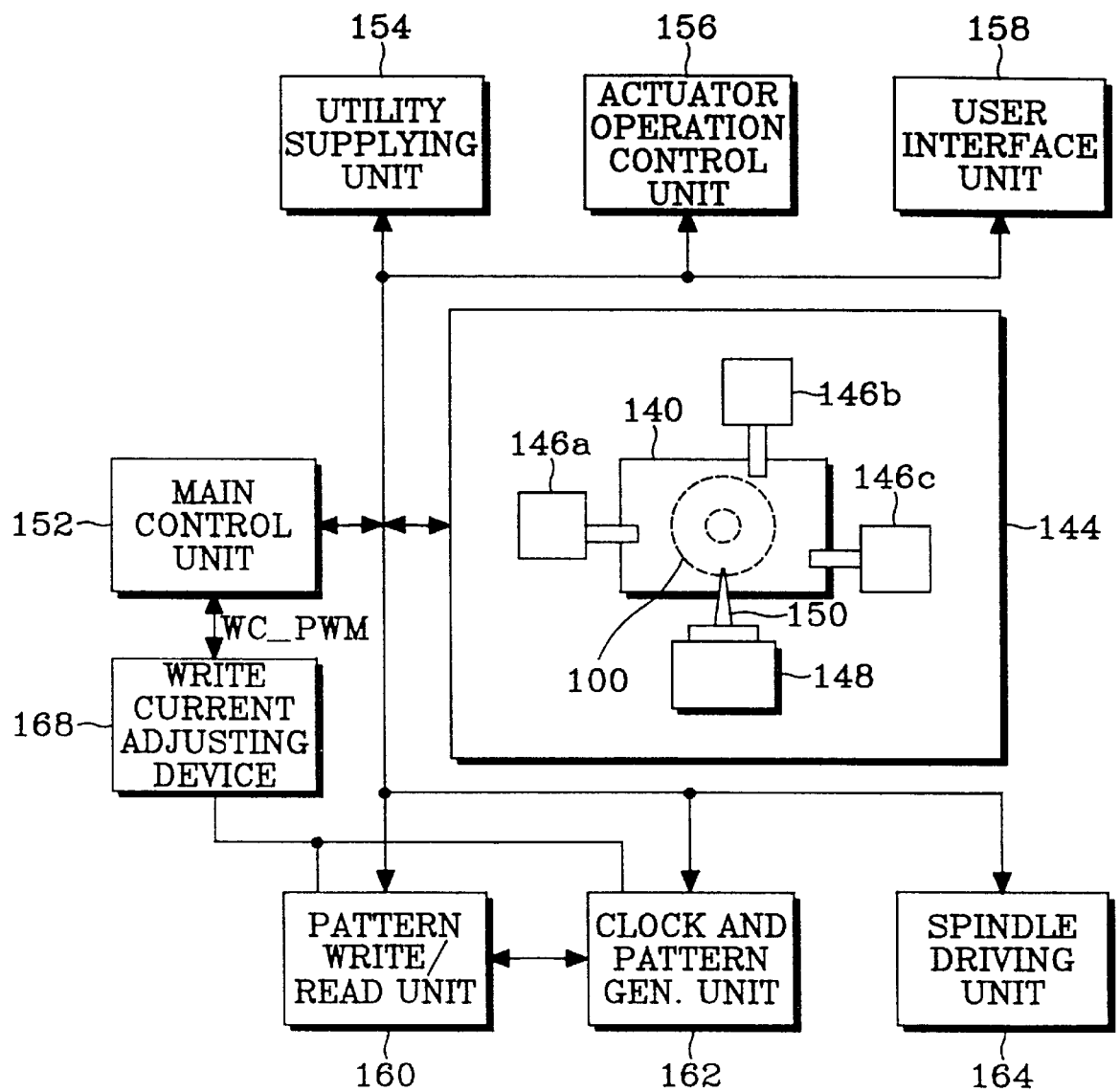
FIG. 3 is a block diagram of a servo writer constructed according to an embodiment of the present invention.

FIG. 3 illustrates a servo writer according to an embodiment of the present invention for writing servo information on the disk 100 after completion of assembling the HDA 140. The servo writer is connected to the HDA 140 by means of pins (not shown) and includes a fixture unit 144, a main control unit 152, an utility supplying unit 154, an actuator operation control unit 156, a user interface unit 158, a pattern write/read unit 160, a clock and pattern generating unit 162, a spindle driving unit 164 and a write current adjusting device 168.

Fixture unit 144 includes clamping units 146a, 146b and 146c for fixing the HDA 140, and includes a clock head unit 148 for writing a reference servo clock on the disks 100 by means of a clock head 150. The reference servo clock is a clock for setting a reference position on the disks 100 during the servo writing, and is written on a predetermined position of the disks 100 which is commonly located at an outer guard band, i.e., a region located at a place more outer than an outermost servo track. The servo track as described refers tracks formed on the disks 100 by the servo writer. Here, the clock head 150 is usually loaded on a reference servo clock position through a hole formed at a side of the HDA 140. The side hole is preferably sealed by a label.

Main control unit 152 and the main controller of the servo writer controls the overall operation of the system. The utility supplying unit 154 supplies air to a power supply (not shown) of the servo writer and the HDA 140. The actuator operation control unit 156 controls a movement of the actuator 108. The user interface unit 158 interfaces between the main control unit 152 and a user terminal which is used by a user for controlling operation of the servo writer or which informs to the user an operation of the servo writer. The pattern write/read unit 160 writes or reads a servo information pattern on/from the disks 100 by means of the heads 102 under the control of the main control unit 152. The clock and pattern generating unit 162 generates the reference servo clock and the servo information pattern under the control of the main control unit 152. The spindle driving unit 164 drives the spindle motor 138 under the control of the main control unit 152.

It should be noted here that the servo writer according to an embodiment of the present invention is featured by a write current adjusting device 168 connected between the main control unit 152 and the pattern write/read unit 160. The main control unit 152 provides the write current adjusting device 168 with a PWM (Pulse Width Modulation) signal WC_PWM having a duty corresponding to a predetermined write current control value, to determine the amount of the write current flow. The write current adjusting device 168 controls write current control terminals of the pattern write/read unit 160 and the clock and pattern generation unit 162 according to the PWM signal WC_PWM, to adjust the write current applied to the heads 102.

Figure 5:
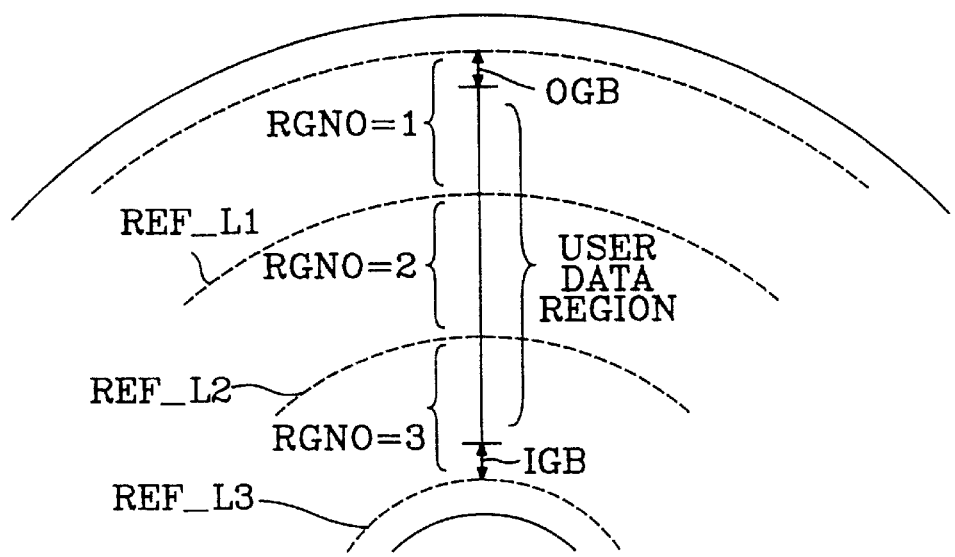
FIG. 5 is an exemplary diagram of a disk divided into three regions for obtaining an optimal write current according to an embodiment of the present invention.

Referring to FIG. 5, the disk is commonly divided into an outer guard band OGB, a user data region, and an inner guard band IGB. It should be noted that a disk region covering from an outer circumference of the outer guard band OGB to an inner circumference of the inner guard band IGB according to the present invention is divided into three regions RGNO=1, RGNO=2 and RGNO=3 in the concentric circular direction. Here, the innermost circumference of the outer region RGNO=1 becomes a first reference position line REF_L1, the innermost circumference of the middle region RGNO=2 becomes a second reference position line REF_L2, and the innermost circumference of the inner region RGNO=3 becomes a third reference position line REF_L3. The first through third reference position lines REF_L1, REF_L2, and REF_L3 have position values previously calibrated by the servo writer.

Figure 4:
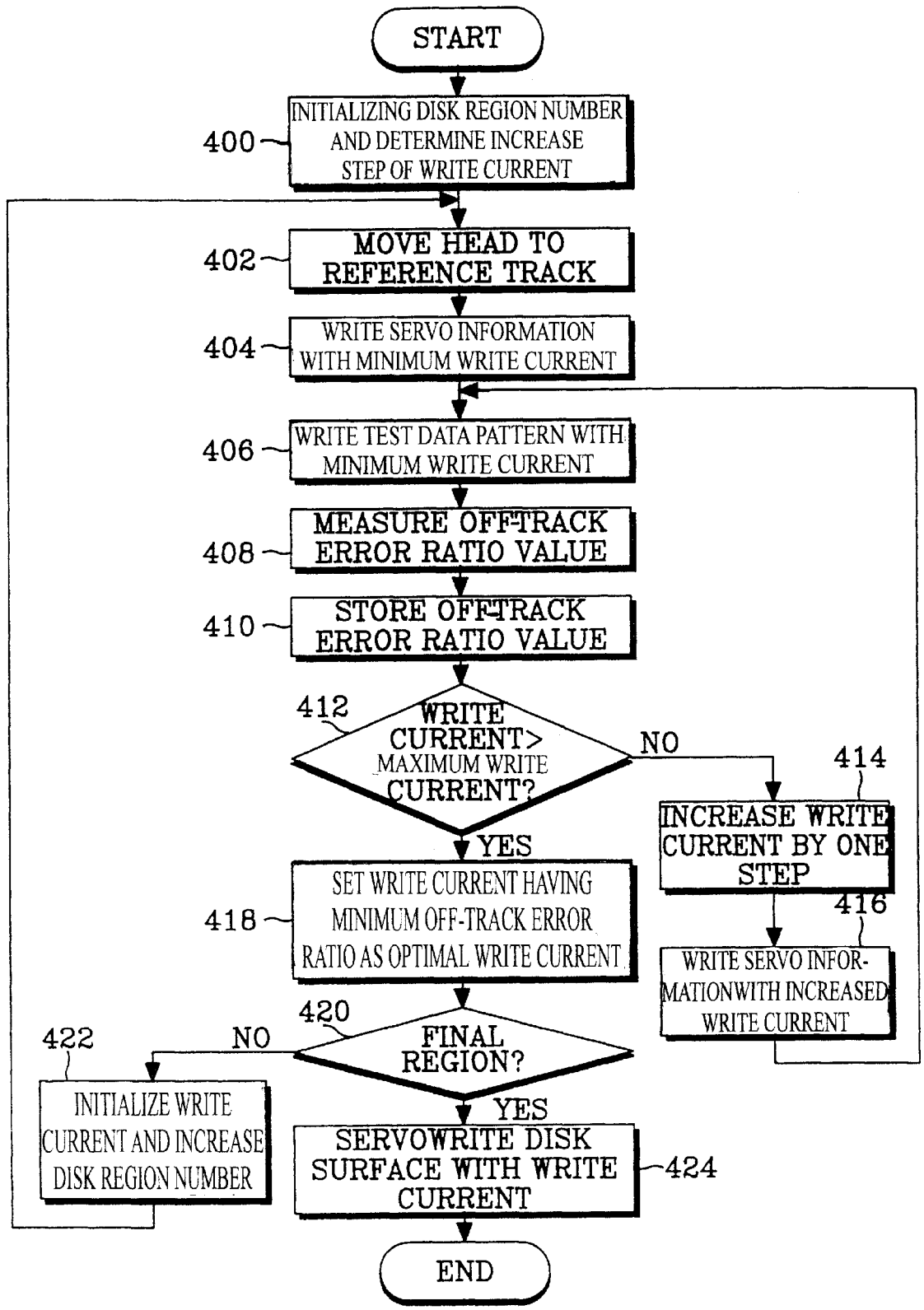
FIG. 4 is a flow chart of a process for optimizing a write current during a servo writing according to the principles of the present invention.

Now, operation of the present invention and a method of obtaining optimal write current for a disk surface corresponding to any selected one of the heads 102 in the HDA 140 will be described in detail with reference to FIGS. 3 to 5 hereinbelow.

First, it should be noted that the optimal write current with respect to the non-selected heads can be obtained in the same manner as those selected heads. The main control unit 152 initializes, at step 400, a disk region number corresponding to the selected head of the heads 102, and determines an increasing step of the write current. A range of the write current during the servo writing operation is set approximately from 5 mA to 20 mA. For instance, the write current can have 256 steps with each range being 10 mA. Thereafter, the main control unit 152 proceeds to step 402 to move the head 102 to a reference track of a corresponding region by means of the actuator operation control unit 156. Namely, the head 102 moves to the first reference position line REF_L1 which is the innermost circumference of the outer region RGNO=1. The reason the reference position is established at the innermost circumference is that the innermost circumference has the worst disk condition in the corresponding region.

The main control unit 152 then proceeds to step 404 to write the servo information on the first reference position line REF_L1 with the minimum write current by means of the write current adjusting device 168, the pattern write/read unit 160 and the clock and pattern generation unit 162. Then, the main control unit 152 writes, at step 406, a test data pattern on data fields positioned between servo fields on which the servo information is written. Thereafter, the actuator operation control unit 156 servo controls the head 102, causing an off-track of the head 102. Then, the written test data pattern is read out at predetermined times, at step 408, to measure an off-track error ratio value. If the pattern write/read unit 160 is constructed of a PRML (Partial Response, Maximum Likelihood) type chip, a channel quality value is measured. The PRML type pattern write/read unit 160 compares an estimated read value for the write test data with an actually-read test data to generate a resultant output waveform which becomes the channel quality value.

The main control unit 152 stores, at step 410, the measured off-track error ratio value into an internal memory and checks, at step 412, whether or not the write current flows greater than the in maximum write current. If the write current flows less than the maximum write current, the main control unit 152 proceeds to step 414 to increase the write current by one step by means of the write current adjusting device 168. Then, the servo information is written into the first reference line REF_L1 with the increased write current, at step 416. Thereafter, the main control unit 152 returns to step 406 to repeat the succeeding steps. In this manner, the off-track error ratio values corresponding to all the predetermined steps (for example, 256 steps) can be stored into the internal memory. If the current of the final step exceeds the maximum write current at step 412, the main control unit 152 proceeds to step 418 to search for a write current value having a minimum off-track error ratio value selected from all off-track error ratio values stored in the internal memory in order to set the write current value as an optimal write current value of the corresponding region, i.e., the outer region RGNO=1.

Then, the main control unit 152 checks, at step 420, whether or not the current region is the final region (i.e., the inner region RGNO=3). If the current region is not the final region, the main control unit 152 proceeds to step 422 to initialize the write current and increase the region number. In this case, for example, the increased region will become the middle region RGNO=2. Thereafter, the main control unit 152 returns to step 402 to repeat the succeeding steps. In this manner, an optimal write current value of the middle region RGNO=2 can be established. It can be appreciated that an optimal write current value of the final region (i.e., the inner region RGNO=3) can also be established in similar manner. The main control unit 152 proceeds to step 424, if the optimal write current for the final region is completely established.

The main control unit 152 servo writes, at step 424, the corresponding disk surfaces by using the write current values of the respective regions (e.g., RGNO=1, RGNO=2, and RGNO=3).

As described, the present invention measures the head performance at the inner, outer, and middle regions before writing the servo information by means of the servo writer to determine the corresponding optimal write current value and then, writes the servo information with the optimal write current value in order to obtain the highest quality servo.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for optimizing a write current during a servo writing operation of a magnetic disk recording device using a servo writer, comprising the steps of:

organizing a disk into a plurality of organized regions along a radial direction;

writing servo information on a reference track of a corresponding organized region of the disk at each predetermined step of a write current from a predetermined minimum write current to a predetermined maximum write current;

writing a test data pattern on the disk on a data field corresponding to the servo information written at a corresponding predetermined step of write current;

reading the written test data pattern for said corresponding predetermined step of write current to measure an off-track error ratio value corresponding to said corresponding predetermined step of write current for a corresponding organized region of the disk;

determining an optimal write current value corresponding to a minimum off-track error ratio value for each of respective organized regions of said disk by respectively using each corresponding measured off-track error ratio value for a corresponding organized region of the disk; and writing servo information in specific tracks of the respective organized regions of said disk by using optimal write current values corresponding to minimum off-track error ratio values that correspond to said respective organized regions of said disk.

2. The method as claimed in claim 1, wherein said disk is organized in at least two regions along the radial direction.

3. A method for optimizing a write current during servo writing of a magnetic disk recording device in a servo writer, comprising the steps of:

organizing a disk into a plurality of data regions along a radial direction;

moving, for each of the data regions, a transducer head to a reference track of a respective data region of the disk;

writing servo information on said reference track of a corresponding data region of the disk by increasing a write current from a predetermined minimum write current to a predetermined maximum write current, and measuring off-track error ratio values to determine a minimum off-track error ratio value for the corresponding data region of the disk by reading the servo information at predetermined times based on an off-track servo control;

setting, for each data region of the disk, an optimal write current value as a write current value corresponding to the minimum off-track error ratio value from all the off-track error ratio values for the corresponding data region of the disk; and writing the servo information on respective data regions of the disk by using optimal write current values corresponding to minimum off-track error ratio values that correspond to the respective data regions of the disk.

4. The method as claimed in claim 3, wherein said reference track for a respective data region corresponds to an innermost line of a corresponding respective data region.

5. The method as claimed in claim 4, wherein said reference track is previously calibrated by the servo writer.

6. A servo writer, comprising:

a disk drive having a disk with organized regions;

a head for reading and writing data and servo information on the organized regions of said disk; and a controller for determining, for each of the organized regions of the disk, an optimal write current value corresponding to a minimum off-track error ratio value by using off-track error ratio values, for controlling movement of the head to a reference track, for each of the organized regions of the disk, to write the servo information on a corresponding said reference track in a corresponding organized region of said disk for determining off-track error ratio values used for determining the optimal write current value corresponding to the minimum off-track error ratio value respectively for each organized region of the disk, and for controlling the head to write servo information on respective organized regions of the disk by using optimal write current values corresponding to minimum off-track error ratio values that correspond to said respective organized regions of the disk.

7. The servo writer as claimed in claim 6, wherein said disk is organized in at least two regions along a radial direction.

8. The servo writer as claimed in claim 6, wherein said reference track for a corresponding organized region corresponds to an innermost line of the corresponding organized region.

9. The servo writer as claimed in claim 6, wherein said reference track is previously calibrated by the servo writer.

* * * * *